(12) United States Patent
Tetrick

(10) Patent No.: US 6,912,556 B1
(45) Date of Patent: Jun. 28, 2005

(54) SILICON AVERAGING MEASUREMENT CIRCUIT

(75) Inventor: Raymond S. Tetrick, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 687 days.

(21) Appl. No.: 09/222,953

(22) Filed: Dec. 30, 1998

(51) Int. Cl.$^7$ .............................................. G06F 7/38
(52) U.S. Cl. ..................................................... 708/445
(58) Field of Search ................................ 708/202, 304, 708/445

(56) References Cited

U.S. PATENT DOCUMENTS

| | | | | |
|---|---|---|---|---|
| 3,638,001 A | * | 1/1972 | Gordon | 708/161 |
| 4,339,803 A | * | 7/1982 | Michael et al. | 708/322 |
| 4,829,460 A | * | 5/1989 | Ito | 708/209 |
| 5,448,508 A | * | 9/1995 | Ono et al. | 708/445 |

* cited by examiner

Primary Examiner—Chuong Dinh Ngo
(74) Attorney, Agent, or Firm—Kenyon & Kenyon

(57) ABSTRACT

An averaging measurement circuit comprises a register successively storing a series of data words having a plurality of bits and providing, for each of said data words, a first output consisting of all of the plurality of bits of the data word and a second output consisting of a number of the higher order bits of the data word. A subtracter subtracts each second output of the register from a corresponding data sample and outputs the corresponding subtraction result. An adder adds each first output of the register to a corresponding subtraction result and storing the result in the register.

21 Claims, 5 Drawing Sheets

SILICON AVERAGING MEASUREMENT CIRCUIT

BACKGROUND

1. Field

This invention relates generally to averaging measurement circuits. In particular, the present invention relates to averaging measurement circuits in a silicon chip.

2. Description

Conventional average measuring circuits use two registers to obtain an average. The first register is used to count the number of data events and the second register stores the sum of the data of the counted events. At least the second register of such an average measuring circuit is large enough, 32 or 64 bits, for example, to store the data sum. See FIG. 1. An average is obtained by dividing the data sum stored in the second counter by the number of events stored in the first counter. This division is not done at the time the data events are received and stored; it is done at some later time usually during execution of some program. Thus, each individual data event is stored at least until the average for which it may be desired is calculated.

An additional problem is that, if the data values being averaged relates to the operational efficiency of a processor, the prior art method of obtaining an average by referring to the earlier stored contents of the two registers itself perturbs the efficiency of the processor being measured. Consequently, moving averages are usually taken over an extremely large number of samples.

An additional problem is that silicon chips typically include huge multi-purpose counters which can be used to store any number of different events occurring in the chip. The counted events can be used to adjust software operations, etc. A moving average is usually generated by dividing one of the huge multi-purpose counters by another counter. Such a method is disadvantageous in a silicon chip because the counters are very large and they consequently employ a significant part of the available silicon area.

SUMMARY

An embodiment of the present invention is directed to averaging measurement circuits. In a first aspect of the invention, a method of successively measuring the moving average for each data sample in a series of data samples relating to the operation of a device and storing the moving average, comprises subtracting the moving average for the immediately preceding data sample from the data sample for which the moving average is to be measured; adding the multiplication result to the moving average for the immediately preceding data sample; and storing the sum.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of the invention. While the foregoing and following written and illustrated disclosure focuses on disclosing example embodiments of the invention, it should be clearly understood that the same is by way of illustration and example only and is not to be taken by way of limitation, the spirit and scope of the present invention being limited only by the terms of the claims in the patent issuing from this application.

DETAILED DESCRIPTION

Figure 1:
FIG. 1 is a generalized block diagram providing a basic illustration of the registers conventionally used to measure a moving average.

An embodiment of the present invention seeks to eliminate one of the large counters and reduce the size of the other counter in a conventional average measuring circuit by using relatively simple parts. An example application of the invention is in a processor or chipset having performance counters for performance monitoring. In particular, an example embodiment of the invention can be incorporated in the silicon of the processor of a server device, such as in the Intel Xeon™ processor. It is desirable in such a processor to count and store multiple events and calculate a moving average. A moving average obtained by the example embodiment of the invention allows the current state of the system, such as the average memory latency or number of cache hits, to be tracked. These averages can be used, for example, to adjust prefetch processes in control software.

The example embodiment of the invention may of course be applied in any silicon chip and indeed wherever an average measuring circuit is desired for whatever reason. For example, an embodiment of the invention may be used in analyzing the performance of an I/O card installed on a Peripheral Component Interconnect (PCI) bus coupled to a processor chipset and the performance of the I/O card could be improved based on the calculated moving average. The PCI bus is a high performance 32 or 64 bit synchronous bus with automatic configurability and multiplexed address, control and data lines as described in the latest version of "PCI Local Bus Specification, Revision 2.1" set forth by the PCI Special Interest Group (SIG) on Jun. 1, 1995. Currently, the PCI architecture provides the most common method used to extend computer systems for add-on arrangements (e.g., expansion cards) with new video, networking, or disk memory storage capabilities.

As another example, the effectiveness of memory accesses could be monitored by an averaging measurement circuit located in the silicon of the memory chipset. As yet another example, a compiler could be improved based on the fact that it generates a certain code sequence having a certain time delay associated with it or a failure to predict branches correctly. The operation of the compiler could be modified so that it generates a code that is better for a processor using the calculated moving average.

In the example embodiment of the invention, the averaging measurement circuit is implemented in a silicon chip and calculates an exponential moving average where recent events are weighted more heavily than older events. An exponential moving average can be defined as:

$$a_{n+1} = Ba_n + (1-B)d_{n+1} \qquad (1)$$

where,
- a is the moving average
- B is the averaging constant (between 1 and 0)
- d is the current data value.

If B is set equal to 0, then the equation reduces to $a_{n+1}=d_{n+1}$ and the moving average is equal to the most recent data value. At the other extreme, if B is set equal to 1, the equation reduces to $a_{n+1}=a_n$ and the moving average remains the same regardless of the most recent data value.

Unfortunately, equation (1) employs two separate multiplication operations. An embodiment of the invention reduces this to one multiplication operation by rearrangement of equation (1) as follows:

$$a_{n+1}=(1-1+B)a_n+(1-B)d_{n+1} \quad (2)$$

$$a_{n+1}=(1-(1-B))a_n+(1-B)d_{n+1} \quad (3)$$

$$a_{n+1}=a_n-(1-B)a_n+(1-B)d_{n+1} \quad (4)$$

$$a_{n+1}=a_n+(1-B)(d_{n+1}-a_n) \quad (5)$$

Furthermore, equation (5) can be simplified by careful selection of the value set for B. In an embodiment of the invention, B is set equal to $1-\frac{1}{2}^n$, and the moving average equation can be simplified as follows:

$$a_{n+1}=a_n+(1-(1-\frac{1}{2}^n))(d_{n+1}-a_n) \quad (6)$$

$$a_{n+1}=a_n+(1-1+\frac{1}{2}^n)(d_{n+1}-a_n) \quad (7)$$

$$a_{n+1}=a_n+\frac{1}{2}^n(d_{n+1}-a_n) \quad (8)$$

It is advantageous that B is set so that the operand for the multiplication operation is a binary fraction of $\frac{1}{2}^n$, which can be performed easily as a simple shift operation, rather than a decimal value requiring a floating point operation.

Figure 2:
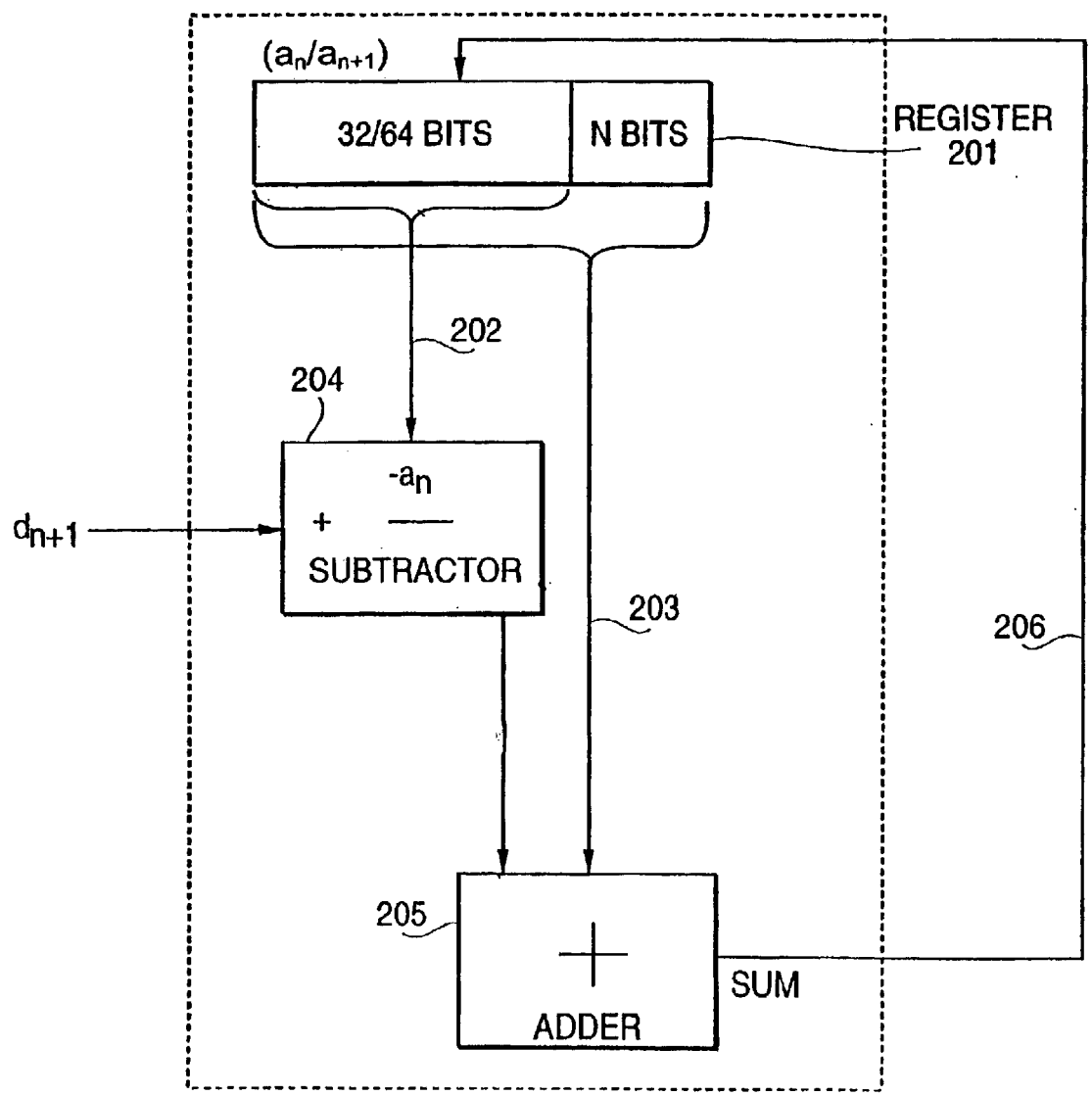
FIG. 2 is a block diagram illustrating an example embodiment of an averaging measurement circuit according to the invention.

An example circuit implementation of equation (8) is provided in FIG. 2. Register 201 stores a data word including the moving average $a_n$. All of the bits of register 201 except the n lower order bits are extracted from register 201 (thereby effecting the shift operation) and then supplied to subtractor 204 as a first output 202. Subtractor 204 receives data value $d_{n+1}$, and subtracts first output signal 202 from data value $d_{n+1}$. The output signal of subtractor 204 is then supplied to adder 205 where it is added to the previous moving average $a_n$ (all of the bits in register 201 constituting second output signal 203). The resulting sum 206 is then stored in register 201.

Operation of the example circuit can perhaps best be explained using a very simple series of data values. Assume, for simplicity's sake, that each data value is equal to one and that we wish to calculate the moving average of four successive data values. Calculation of the moving average can be illustrated by Table 1 below.

The first two columns show the number and value of the data sample, respectively. The fourth and sixth columns respectively show the value stored in Register 201 before and after the data sample is considered in calculating the moving average. The third and fifth columns respectively show the value of the moving average before and after the data sample is considered.

TABLE 1

| Sample | $d_{n+1}$ | $a_n$ | Register$_n$ | $a_{n+1}$ | Register$_{n+1}$ |
|---|---|---|---|---|---|
|  |  |  | 0 |  | 0 |
| 1 | 1 | 0 | 0 | 0 | 1 |
| 2 | 1 | 0 | 1 | 0 | 2 |

TABLE 1-continued

| Sample | $d_{n+1}$ | $a_n$ | Register$_n$ | $a_{n+1}$ | Register$_{n+1}$ |
|---|---|---|---|---|---|
| 3 | 1 | 0 | 2 | 0 | 3 |
| 4 | 1 | 0 | 3 | 1 | 4 |
| 5 | 1 | 1 | 4 | 1 | 4 |
| 6 | 1 | 1 | 4 | 1 | 4 |

Since each moving average is taken over four data values, first output signal 202 of register 201 is arranged so that it does not include the two lowest order bits ($4=2^n$, where n=2). In the example embodiment, the number of higher order bits extracted from register 201 for first output signal 202 is a binary number such as 8, 16, 32, etc.

At the beginning of the samples shown in Table 1, the respective values of Register 201 and the moving average $a_n$ are both 0. When sample 1 (having a value of 1) is received, a value of 1 ($d_{n+1}-a_n+$Register$_n$, equal to 1−0+0) is written into Register 201. However, since the value of 1 is represented in the lowest order bit, $a_n$ remains 0. For sample 2, a value of 2 (1−0+1) is written into Register 201. Since the binary representation of 2 is in the two lowest order bits, $a_n$ remains 0. For sample 3, a value of 3 (1−0+2) is written into Register 201. Once again since the binary representation of 3 is made in the two lowest order bits, $a_n$ remains 0. At sample 4, a value of 4 (1−0+3) is written into Register 201. At this point, since 4 is represented in binary form as 00000100, $a_n$ comprises all of the bits except the two lowest bits becomes 00001, providing a moving average of 1.

As the data samples having a value of 1 continue to be received, $a_n$ remains equal to 1. At sample 5, a value of 4 (1−1+4) is written into Register 201. Thus, $a_n$ stays equal to 1. Similarly, $a_n$ will stay locked at a value of 4 for samples 6 and subsequent all having a value of 1.

In this manner, an accurate representation of the moving average is obtained even though it is not calculated by maintaining the sum of the data values in one large register and dividing the sum by the total of samples maintained in a second register. Only one register is employed to do the averaging operation in the example embodiment instead of the two used in the prior art. Since, for a large number of data samples, the average varies by a small amount, the register does not need to have the large size employed in the prior art to store the sum of the data samples.

The example worked out above with respect to Table 1 is a simple one having small data values. However, the example embodiment is useful even for large data values, such as, for example, the rate at which data bits are being transferred to or from a memory or an input/output device. The adjustment is matching the size of the register to accommodate the expected average.

The example embodiment is well suited for implementation in hardware. For example, known processors have a counter which counts the number of instructions that have been run by the processor. The processors also count the number of cache hits so that a ratio may be calculated of the number of cache hits per instruction. The frequency of such hardware events is in the nanosecond range and a large number of values is produced.

Register 201, subtractor 204 and adder 205 may be composed of conventional elements known in the art. Data samples also may be obtained and provided to subtractor 204 in the manner presently known in the art. The averaging circuit may be adapted to accept data samples of different types during different average measuring operations.

Control separate from the processor may be provided to control clock signals and synchronization timing and clearing and initialization of the register (either by a reset operation or writing a value of zero to the register) in order to start taking samples and measure the moving average of the samples. The control could also provide for the number of samples the average would be taken over and indicate when measuring of the moving average would terminate. Termination of the measuring can be designated to occur according to the relative time from the beginning of measuring (such as one minute after samples start to be measured), absolute time (e.g., at 1:00 p.m.), the number of samples received (such as counting samples 1–50), detection of an external condition, receipt of an external interrupt, etc. of course, the moving average may be measured automatically starting at boot-up of the machine, in which case the control may provide clock signals and synchronization timing control in the manner known in the art.

Figure 3:
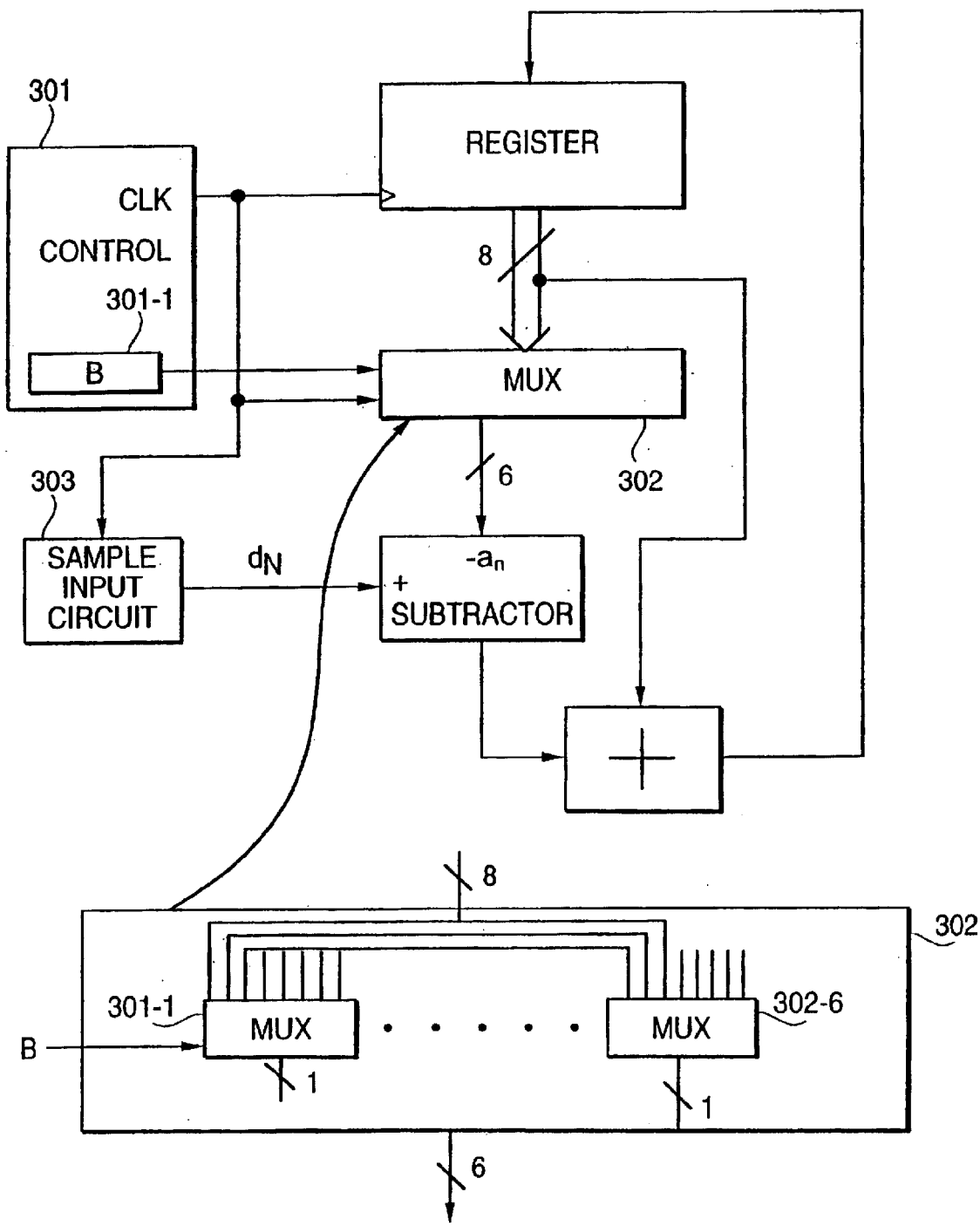
FIG. 3 is a diagram helpful for describing the control circuitry for the average measuring circuit shown in FIG. 1.

The control may be effectuated by hardware such as a register controller known in the art or it may be a programmed event in software. An example of a silicon-based hardware control for the average measuring circuit is set forth in FIG. 3. In addition to register 201 storing a fixed number of bits, there is a controller 301 which may contain a register 301-1 adapted to store the weighting constant B in equation (5) above.

The value of B may be set and changed by controller 301 programmatically. As explained above, the value of B is related to the number of samples being averaged and the shift operation for the bits stored in register 201. The control includes multiplexor 302 which multiplexes the bits from register 201 and the value of B from register 301-1 is used to control the multiplexing performed in multiplexor 302.

Assume for the purposes of explanation that register 201 stores and outputs 8 bits in parallel (register 201 may store and output any selected number of bits) and that B has been set to a value such that a shift operation of two bits is performed so that the two lowest order bits in register 201 are not included in the moving average (B may be set to any binary value). Multiplexor 302 would then comprise six 8-to-1 multiplexors 302-1 to 302-2 which each receive the 8 bits output from register 201 and outputs a selected one of the bits. The six bits output from respective multiplexors 302-1 to 302-6 represent the moving average and are provided to subtractor 204 to be subtracted from the data sample value. The original eight bits from register 201 are passed unchanged to adder 206.

As to timing, register 201, multiplexor 302 and sample input circuit 303 receive a clock signal which sets the rate of the data samples and synchronizes the data samples. Consequently, the output signal comprising bits from register 201 is not delayed as it is passed through to the combinatorial logic.

Figure 4:
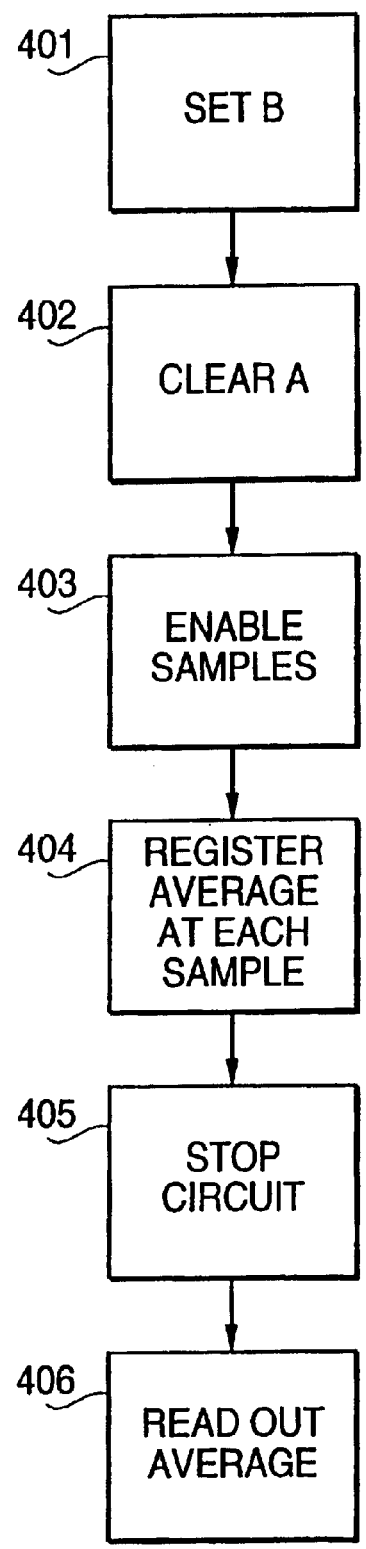
FIG. 4 is a flowchart illustrating an example method of obtaining an average in the averaging measurement circuit shown in FIG. 1.

The sequence of events in performing an averaging operation using the averaging measurement circuit is illustrated in FIG. 4. At block 401, the control sets the value of B stored in register 301-1. At block 402, register 201 is cleared either programmatically or as a result of storing of the value of B in register 301-1. At block 403, the circuitry is set up to receive the data samples and supply them to subtractor 204. When each sample is received, the new moving average is obtained and stored into register 201 (block 404). Block 405 signifies the end of receipt of the data samples to be averaged and termination of operation of the averaging circuit. The final operation (block 406) is reading out the moving average from register 201.

Figure 5:
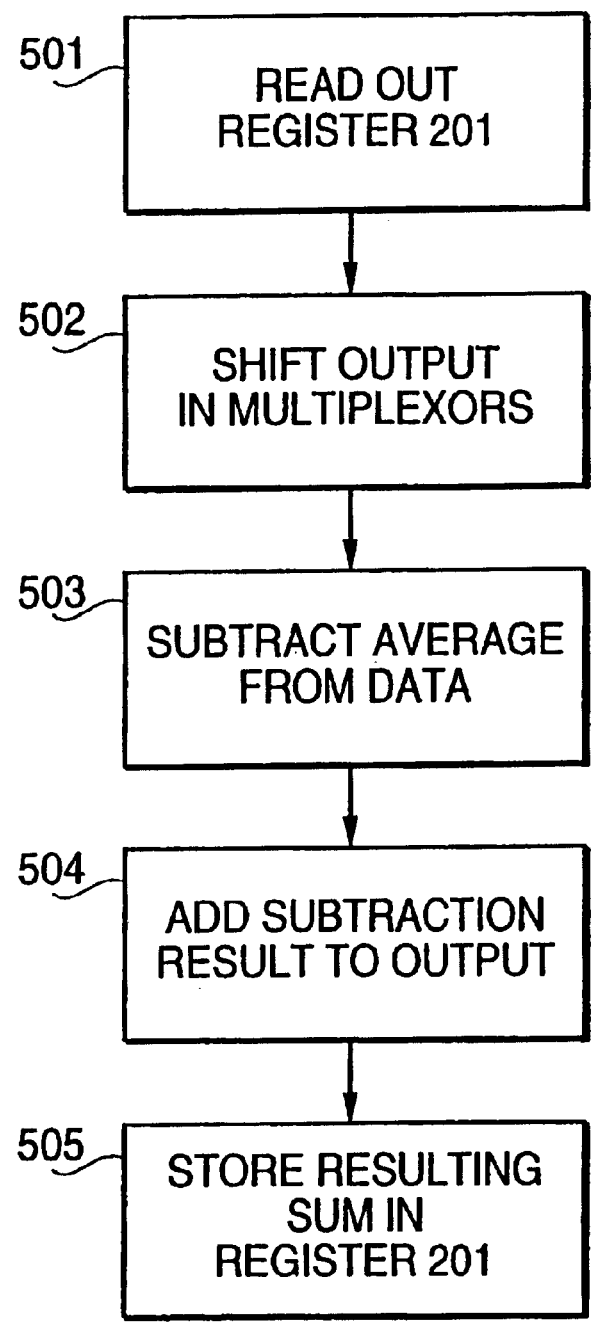
FIG. 5 is a flowchart illustrating an example of a sequence of operations in the method shown in FIG. 1.

The calculation and registering of the average at each sample (see block 404) comprises several sequential smaller blocks as shown in FIG. 5. At block 501, the value stored in register 201 is read out. At block 502, the output signal of register 201 is shifted in multiplexors 302-1 to 302-6 according to the value of B stored in register 301-1 to provide the moving average. At block 503, the moving average is subtracted from the data sample. At block 504, the subtraction result is added to the output signal of register 201 (before being shifted in multiplexors 302-1 to 302-6). At block 505, the resulting sum is stored in register 201.

Although an example embodiment, the invention is not limited to the Intel XEON™ processor or any other processor. Indeed, an embodiment of the invention is particularly useful for any silicon device eploying large registers for measuring an average of successive data values. An embodiment of the invention may be used in any device in which a simple average measurement circuit is desired.

Other features of the invention may be apparent to those skilled in the art from the detailed description of the example embodiments and claims when read in connection with the accompanying drawings. While the foregoing and following written and illustrated disclosure focuses on disclosing example embodiments of the invention, it should be understood that the same is by way of illustration and example only, is not to be taken by way of limitation and may be modified in learned practice of the invention. While the foregoing has described what are considered to be example embodiments of the invention, it is understood that various modifications may be made therein and that the invention may be implemented in various forms and embodiments, and that it may be applied in numerous applications, only some of which have been described herein. It is intended by the following claims to claim all such modifications and variations.

What is claimed is:

1. An averaging measurement circuit comprising:
   a register adapted to successively store a series of data words having a plurality of bits, said register adapted to provide, for each of said data words, a first output signal comprising all of the plurality of bits of the data word and a second output signal comprising a number of the higher order bits of the data word;
   a subtracter adapted to subtract each second output signal of said register from a corresponding data sample and output a corresponding subtraction result; and
   an adder to add each first output signal of the register to a corresponding subtraction result and store the result in said register.

2. The averaging measurement circuit recited in claim 1, wherein a multiplexor in the register is adapted to provide the second output signal comprising a number of the higher order bits of the data word.

3. The averaging measurement circuit recited in claim 2, wherein the multiplexor is adapted to perform a shift operation to provide the second output signal comprising a number of the higher order bits of the data word.

4. The averaging measurement circuit recited in claim 1, wherein each data sample comprising a predetermined number of bits and said first output signal has the same number of bits as said data samples.

5. The averaging measurement circuit recited in claim 1, wherein the register, subtracter and adder are included in the silicon of a chip.

6. A processor comprising:
   control circuitry to control an operating parameter of the processor; and
   an averaging measurement circuit to measure the moving average of a value relating to the operation of the processor, the averaging measurement circuit comprising:

a register to successively store a series of data words having a plurality of bits, said register to provide, for each of said data words, a first output signal comprising of all of the plurality of bits of the data word and a second output signal comprising a number of the higher order bits of the data word;

a subtracter to subtract each second output signal of said register from a corresponding data sample and to output a corresponding subtraction result; and an adder to add each first output signal of the register to a corresponding subtraction result and to store the result in said register.

7. The processor recited in claim 6, wherein a multiplexer in the register is adapted to provide the second output signal comprising a number of the higher order bits of the data word.

8. The processor recited in claim 7, wherein the multiplexer is adapted to perform a shift operation to provide the second output signal comprising a number of the higher order bits of the data word.

9. The processor recited in claim 6, wherein each data sample comprises a predetermined number of bits and said first output signal has the same number of bits as said data samples.

10. The processor recited in claim 6, wherein the control circuitry and averaging measurement circuit are included in the same silicon.

11. A method of successively measuring the moving average for each data sample in a series of data samples relating to the operation of a device and storing data including the moving average in a register, comprising:

subtracting the moving average for the immediately preceding data sample from the data sample for which the moving average is to be measured;

adding the subtraction result to the output of a register which stores data including the moving average for the immediately preceding data sample; and storing the sum in said register.

12. The method recited in claim 11, further comprising multiplying the sum stored in said register by a beta factor, equal to $\frac{1}{2}^n$ where n is a positive integer.

13. The method recited in claim 12, wherein the beta factor is stored in a register at the beginning of the averaging operation.

14. The method recited in claim 12, wherein the multiplication is carried out by a plurality of multiplexors.

15. The method recited in claim 14, wherein the multiplexors receive a control signal related to the beta value and shift output signals of the stored moving average accordingly.

16. The method recited in claim 11, wherein the device comprises a processor implemented in a silicon chip and the method is included in said silicon chip.

17. An averaging measurement circuit comprising:

a register to store a data word having a plurality of bits, and to provide, for said data word, a first output signal comprising a first plurality of the bits of the data word and a second output signal comprising a second plurality of the bits of the data word, the second plurality of bits being greater than the first plurality of bits;

a subtracter to subtract said second output signal of said register from a corresponding data sample and output a corresponding subtraction result; and an adder to add said first output signal of the register to a corresponding subtraction result and store the result in said register.

18. The averaging measurement circuit recited in claim 17, wherein a multiplexor in the register provides the second output signal.

19. The averaging measurement circuit recited in claim 18, wherein the multiplexor performs a shift operation to provide the second output signal.

20. The averaging measurement circuit recited in claim 17, wherein said data sample comprises a predetermined number of bits and said first output signal has the same number of bits as said data sample.

21. The averaging measurement circuit recited in claim 17, wherein the register, subtracter and adder are included in the silicon of a chip.

* * * * *

UNITED STATES PATENT AND TRADEMARK OFFICE
CERTIFICATE OF CORRECTION

PATENT NO.     : 6,912,556 B1
DATED           : June 28, 2005
INVENTOR(S)  : Raymond S. Tetrick It is certified that error appears in the above-identified patent and that said Letters Patent is hereby corrected as shown below:

Column 7,
Lines 3-4, "comprising of all of the plurality" should be -- comprising all of the plurality --.
Line 42, "equal to $1/2^n$" should be -- equal to 1/2n --.

Signed and Sealed this

Fifteenth Day of November, 2005

JON W. DUDAS
*Director of the United States Patent and Trademark Office*